No. 711,433. Patented Oct. 14, 1902.
L. P. MEISTER.
INCUBATOR.
(Application filed May 17, 1902.)
(No Model.)
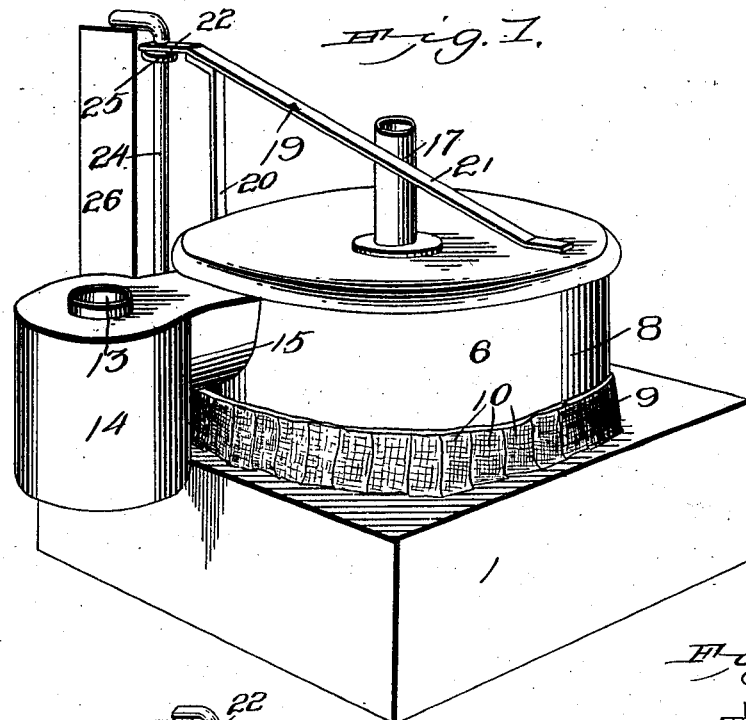
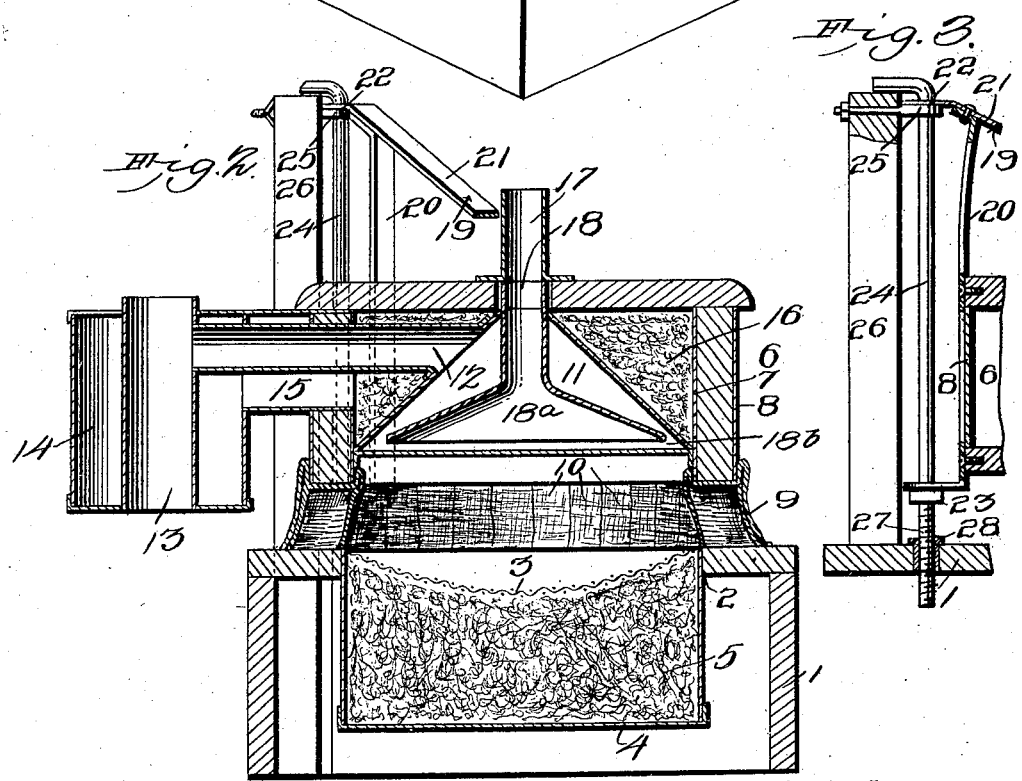
Witnesses
L. P. Meister, Inventor
by C. A. Snow & Co.
Attorneys

UNITED STATES PATENT OFFICE.

LOUIS P. MEISTER, OF TROY, MISSOURI.

INCUBATOR.

SPECIFICATION forming part of Letters Patent No. 711,433, dated October 14, 1902.

Application filed May 17, 1902. Serial No. 107,858. (No model.)

*To all whom it may concern:*

Be it known that I, LOUIS P. MEISTER, a citizen of the United States, residing at Troy, in the county of Lincoln and State of Missouri, have invented a new and useful Incubator, of which the following is a specification.

The invention relates to improvements in incubators.

The object of the present invention is to improve the construction of incubators and to provide a simple and comparatively inexpensive one adapted to expose the eggs being hatched to practically the same conditions existing while eggs are being hatched by a hen and capable of readily exposing the eggs to the atmosphere to permit the eggs to partially cool and to be turned, as is the case when a hen leaves her nest.

A further object of the invention is to provide an incubator of this character which as the eggs are hatched will permit the young chickens to expose themselves to the atmosphere to a greater or less extent with the same facility as when chickens are hatched under a hen.

Another object of the invention is to enable the incubator after the chickens have been hatched to be conveniently employed as a brooder.

The invention consists in the construction and novel combination and arrangement of parts hereinafter fully described, illustrated in the accompanying drawings, and pointed out in the claims hereto appended.

In the drawings, Figure 1 is a perspective view of an incubator constructed in accordance with this invention. Fig. 2 is a vertical sectional view of the same. Fig. 3 is a detail sectional view illustrating the manner of adjustably mounting the hinged heater.

Like numerals of reference designate corresponding parts in all the figures of the drawings.

1 designates a base or platform consisting, preferably, of a rectangular box forming an elevated platform or support and provided with a central circular opening 2, in which is arranged a concavo-convex egg-holder 3, constructed of wire-gauze and presenting an upper egg-receiving concavity which is substantially similar to the configuration of an ordinary hen's nest. Depending from the circular opening of the base is a circular casing 4, constructed of sheet metal or other suitable material and adapted to contain suitable non-heat-conducting material 5, which prevents the escape of heat, and the box-like base forms a dead-air space around the cylindrical casing 4 and assists in confining the heat.

The eggs are maintained at the proper temperature by an approximately cylindrical heater 6, consisting of a wooden cylinder or casing open at the bottom and closed at the top and provided at its vertical walls with inner and outer linings 7 and 8 of sheet metal. Depending from the heater, which is located above the egg-support, is a flexible curtain 9, consisting of a series of layers of fabric or other suitable material, which is cut at regular intervals to form vertical strips 10 to permit the young chickens to pass readily through the curtain to expose themselves to a greater or less extent to the atmosphere as they are hatched. The fabric strips are secured to the cylindrical walls of the heater at the inner and outer faces thereof, and the heating device is adjustably mounted by the means hereinafter described to enable it to be raised and lowered to secure the desired ventilation.

Within the heater or heating device for maintaining the eggs at the desired temperature is arranged a conical drum 11, having an opening at the top for the escape of hot air and connected at one side by a horizontal hot-air pipe 12 with a vertical inner cylindrical shell or sleeve 13 of an exterior drum 14. The exterior drum 14, which is designed to be heated by a lamp or other suitable heating device, consists of the said inner sleeve or shell 13 and an outer shell, which is connected at the top and bottom with the inner sleeve or shell. The outer shell or casing proper is connected by a short arm or conduit 15 with the heating device of the incubator, so that the air heated within the drum will raise the temperature within the casing of the heating device 6 and surrounding the conical interior hot-air drum 11. By this construction the greatest effect is obtained from a lamp or other heating means. The space surrounding the conical hot-air drum 11 is filled with suitable non-heat-conducting material 16, similar to the space beneath the nest, and the eggs are directly exposed to the heat which is radiated from the bottom of the drum 11, which is located directly above the egg-holder. The hot air escapes from the drum 11 through a vertical pipe 17, mounted upon the heating device 6 of the incubator and forming a continuation of the neck 18 of the drum 11. The neck 18 consists of a short pipe or cylindrical extension projecting from the apex of the drum 11 and arranged in a central opening of the top of the casing of the heating device 6.

The short pipe or neck 18 extends downward into the conical drum 11 and supports a conical shield $18^a$, located at a point below the horizontal hot-air pipe 12 and extending downward over the base of the conical drum and terminating short of the periphery of the same to provide an annular space $18^b$ to permit the hot air to pass downward beneath the shield. This construction prevents the bottom of the inner conical drum from being heated too rapidly and from being chilled too suddenly, and corresponding changes in the temperature of the egg chamber or compartment are thereby prevented. The conical shield is provided at its apex with an opening to receive the lower end of the apex $18^a$, which extends through the apex of the conical drum, and the heat from the outer drum enters the top of the inner drum and passes downward beneath the shield and is then permitted to escape. The hot air is not confined in the space beneath the shield.

The heating device 6 of the incubator is supported by a bracket 19, consisting of a vertical bar 20 and an inclined bar or brace 21, and the said bracket is provided at the upper and lower ends of the bar with eyes 22 and 23, receiving a vertically-adjustable pintle 24. The perforated ears consist of extensions of the bars 20 and 21, and the pintle-rod, which is supported near its upper end by an eye 25 of a vertical standard 26, has a threaded lower portion 27, which is arranged in a suitable threaded opening of the base of the incubator, whereby the pintle-rod is adapted to be rotated to move it vertically. The lower portion of the pintle-rod is provided with a supporting-shoulder 28, which receives the lower eye of the bracket, and the latter is adapted to be raised and lowered by the pintle-rod to raise and lower the upper section or heating device of the incubator to position the flexible curtain properly with relation to the base or platform of the incubator to secure the desired ventilation. The standard is suitably fixed to the base of the incubator, and the upper section or heating device is hinged to the standard by the pintle and is adapted to swing horizontally to carry it away from the egg-holder to expose the eggs to the atmosphere and to permit the same to be turned. This operation is substantially the same as the conditions surrounding eggs which are hatched under a hen when the latter leaves the nest.

Any suitable means may be provided for closing or partially closing the upper ends of the sleeve or shell 13 of the outer drum and the escape-pipe 17 of the inner drum, and, if desired, the heat may be supplied to the upper section or heating device of the incubator by hot water or any other suitable means, and, if desired, a thermometer or thermostat may be provided for indicating the temperature or for controlling the same.

It will be seen that the incubator is exceedingly simple and inexpensive in construction, that it is adapted to enable eggs to be hatched artificially under practically the same conditions to which eggs are subjected when they are hatched under a hen, and that after the eggs are hatched the incubator is adapted to be employed as a brooder. The base or platform may be of any desired size, and a suitable fence or frame is designed to be arranged on the same when the chickens begin to hatch to retain the chickens in the incubator.

What I claim is—

1. An incubator comprising a base having an egg-holder arranged in the form of a nest, and an exteriorly-arranged horizontally-movable superimposed section or member forming a heater and provided with a depending curtain surrounding the egg-holder, said upper section or member being adapted to be moved to and from its position over the egg-holder to cover the same and to expose the eggs to the atmosphere, substantially as described.

2. An incubator comprising a base having an egg-holder, and an exteriorly-arranged horizontally movable superimposed section or member hingedly supported over the egg-holder and adapted to be swung from over the same to expose the eggs to the atmosphere, and means for heating the latter, substantially as described.

3. An incubator comprising a base having an egg-holder, an exteriorly-mounted hingedly-mounted superimposed section or member located above the egg-holder and provided with a curtain surrounding the same, said section or member being capable of swinging horizontally to expose the eggs to the atmosphere, and means for heating the latter, substantially as described.

4. An incubator comprising a base having an egg-holder, an exteriorly-arranged superimposed section or member forming a heater and hingedly mounted and arranged to swing horizontally to enable it to be moved from over the egg-holder to expose the eggs to the atmosphere, a curtain depending from the upper section or member and surrounding the egg-holder, and means for adjusting the section or member vertically for controlling the ventilation, substantially as described.

5. An incubator comprising a base, a vertically-adjustable pintle-rod, a bracket hingedly connected with the base by the pintle-rod and arranged to swing horizontally, said bracket being also carried by the pintle-rod in the vertical adjustment thereof, and a section or member secured to the bracket and arranged over the eggs and forming a heater and adapted to be swung from over the eggs, substantially as described.

6. An incubator comprising a base consisting of a box having an opening at the top, an egg-holder depending within the opening of the base and presenting an upper concave face, a casing suspended from the opening of the top of the box and spaced from the walls thereof and provided with non-heat-conducting material, and an exteriorly-mounted superimposed section or member constituting a heating device and arranged over the egg-holder and capable of lateral movement to expose the eggs to the atmosphere, substantially as described.

7. An incubator comprising a base having an egg-holder, a horizontally-movable upper section or member consisting of a casing open at the bottom and provided with a depending curtain, an interior drum located within the upper section or member, an exterior drum provided with inner and outer shells, and inner and outer pipes connecting the inner and outer shells with the inner drum and with the interior of the upper section or member, substantially as described.

8. An incubator comprising a base having an egg-holder, a horizontally-movable approximately cylindrical upper section or member open at the bottom and having a depending curtain, an interior conical drum, an exterior cylindrical drum having inner and outer shells, and inner and outer tubes or pipes connecting the inner and outer shells with the inner drum and with the interior of the upper section or member, and a filling of non-heat-conducting material surrounding the sides of the conical drum, substantially as described.

9. An incubator comprising a base having an egg-holder, an upper section or member having a depending curtain, an interior conical drum, an exterior drum connected with the interior drum, and a conical shield arranged within the conical drum and disposed over the base of the same and terminating short of the periphery thereof to provide an annular space to permit hot air to pass beneath the shield, substantially as described.

In testimony that I claim the foregoing as my own I have hereto affixed my signature in the presence of two witnesses.

LOUIS P. MEISTER.

Witnesses:
CLARENCE A. COPHER,
E. F. BROWN.